United States Patent
Oohashi et al.

(10) Patent No.: US 6,566,781 B2
(45) Date of Patent: May 20, 2003

(54) STATOR FOR AN AUTOMOTIVE ALTERNATOR

(75) Inventors: Atsushi Oohashi, Tokyo (JP); Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/725,868

(22) Filed: Nov. 30, 2000

(65) Prior Publication Data

US 2002/0047483 A1 Apr. 25, 2002

(30) Foreign Application Priority Data

Mar. 28, 2000 (JP) .......................... 2000-089008

(51) Int. Cl.$^7$ .............................. H02K 1/12; H02K 1/06
(52) U.S. Cl. .................... 310/216; 310/254; 310/42; 310/45; 310/180; 310/201
(58) Field of Search .............................. 310/179, 180, 310/201, 254, 216, 263, 45, 42

(56) References Cited

U.S. PATENT DOCUMENTS

| 1,919,995 A | 7/1933 | Wry |
| 4,485,320 A | 11/1984 | Kawada et al. |
| 5,965,965 A | 10/1999 | Umeda et al. |
| 6,072,259 A | * 6/2000 | Kawabata et al. .......... 310/216 |

FOREIGN PATENT DOCUMENTS

| EP | 0 740 400 | 10/1996 | |
| JP | 11-164505 | 6/1999 | ............ H02K/3/24 |

OTHER PUBLICATIONS

Patent Abstracts of Japan vol. 010, No. 228 (E–426), Aug. 8, 1986 & JP 61–062334 A (Mitsubishi Electric Corp), Mar. 31, 1986.
Patent Abstracts of Japan vol. 016, No. 192 (E–1199), May 11, 1992 & JP 04–026345 A (Nippondenso Co Ltd), Jan. 29, 1992.

* cited by examiner

Primary Examiner—Burton S. Mullins

(57) ABSTRACT

In an automotive alternator including a rotor having first and second claw-shaped magnetic poles fitted onto a rotating shaft, and a stator having a stator core supported between front-end and rear-end brackets, a stator coil which is connected into a three-phase alternating current connection being wound into the stator core, the stator core includes a core main body constructed by laminating a strip-shaped steel plate, the core main body including a base portion and a plurality of tooth portions protruding radially inwards from the base portion defining core main body slots, and an end plate which is thicker than the steel plate being disposed on at least one end surface of the core main body.

7 Claims, 12 Drawing Sheets

STATOR FOR AN AUTOMOTIVE ALTERNATOR

BACKGROUND OF THE INVENTION

1. Field of the Invention

The present invention relates to a stator for an automotive alternator, and in particular, relates to a stator for an automotive alternator which is constructed by laminating steel plates.

2. Description of the Related Art

Figure 6:
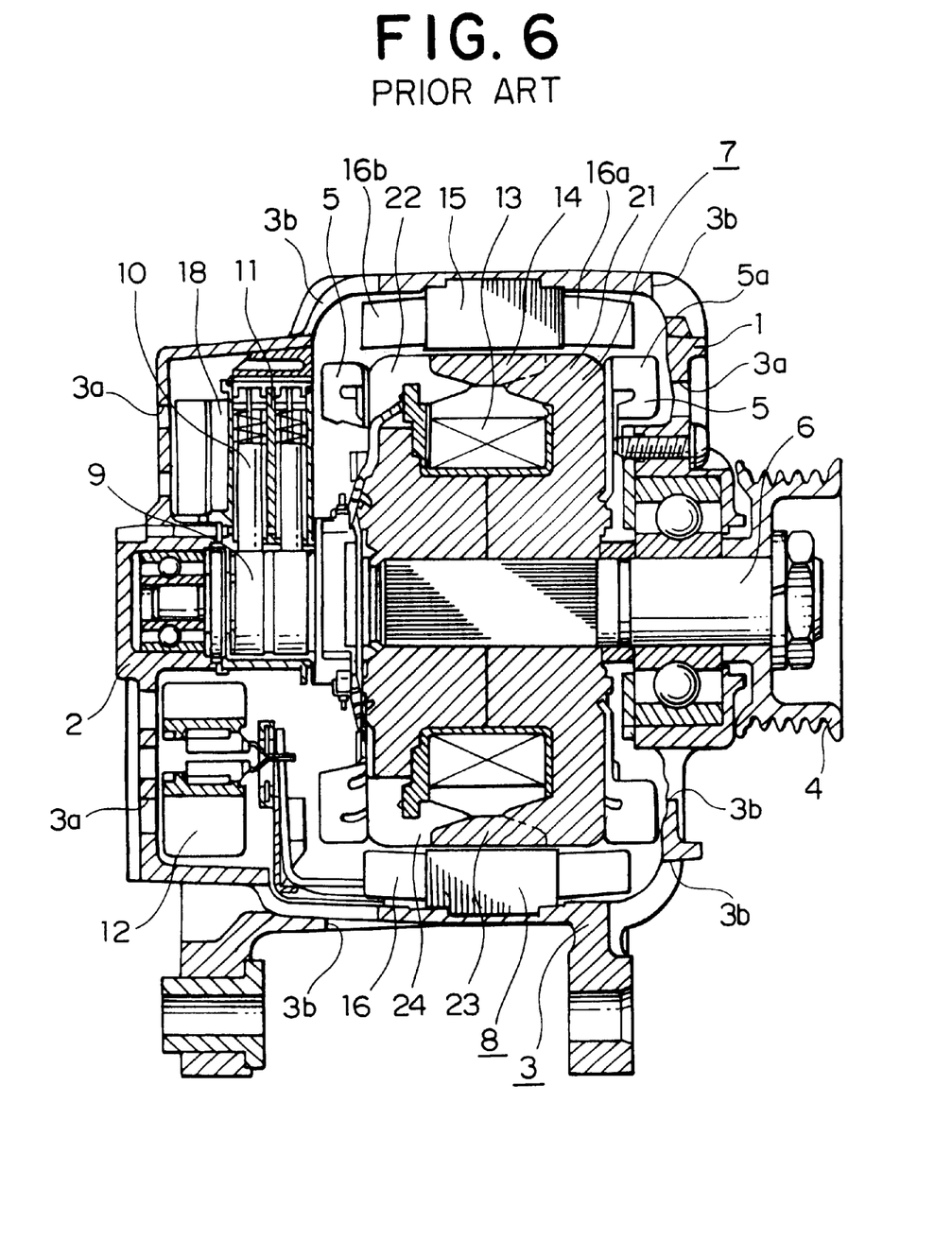
FIG. 6 is a cross section of a conventional automotive alternator.
Figure 7:
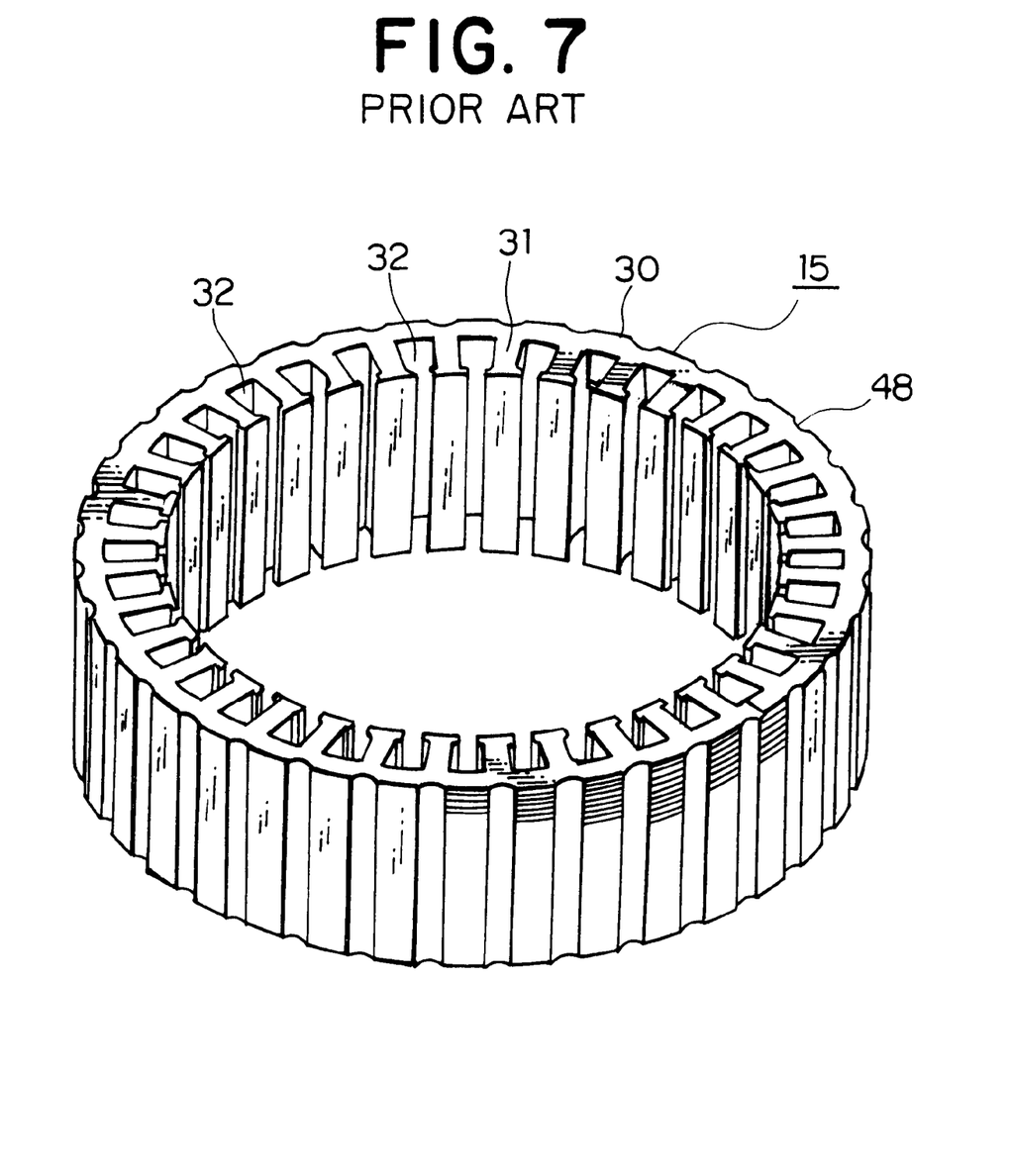
FIG. 7 is a perspective of a stator core in FIG. 6.
Figure 8:
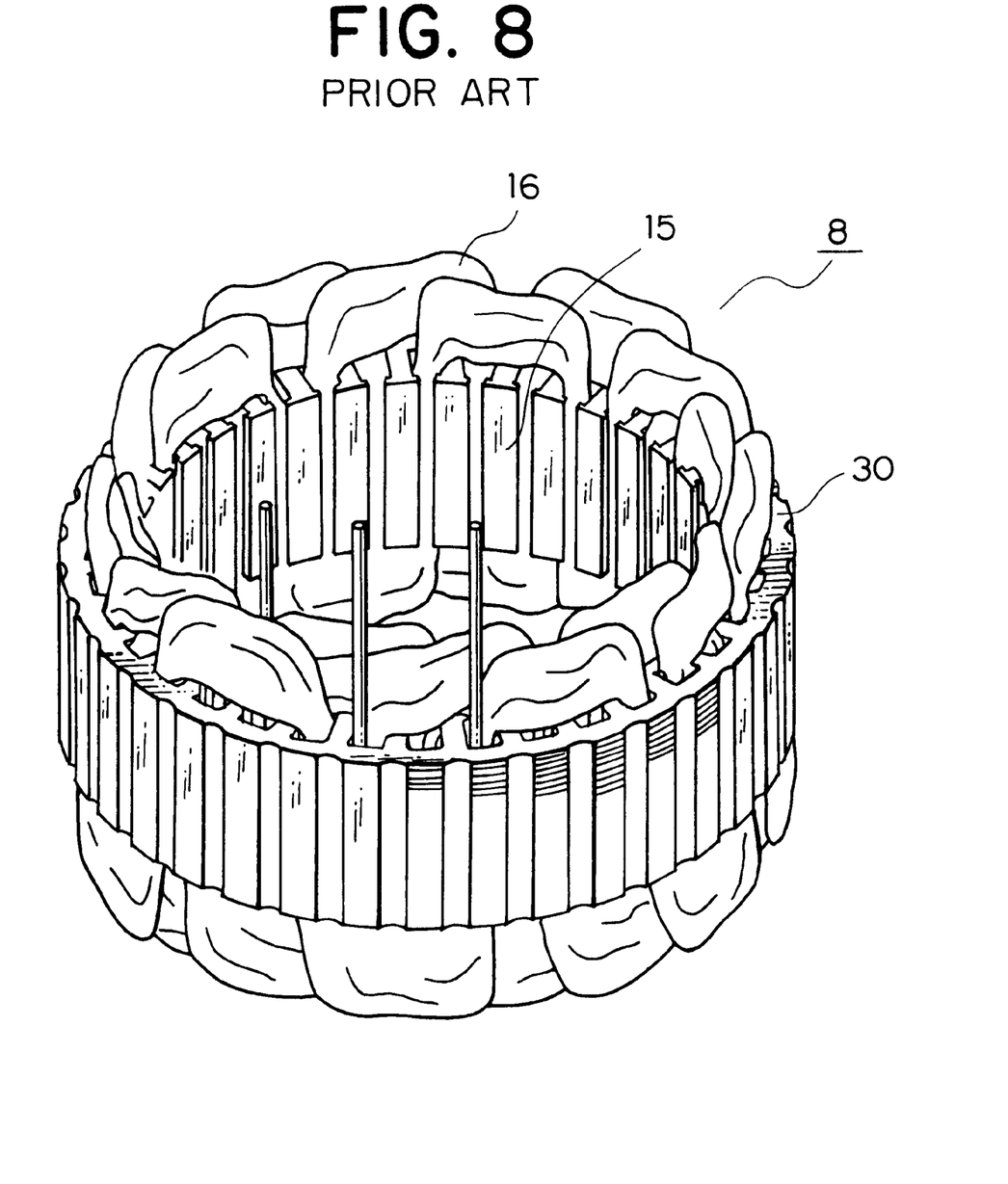
FIG. 8 is a perspective of a stator in FIG. 6.

FIG. 6 is a cross section of a conventional automotive alternator, FIG. 7 is an overall perspective of a stator core in FIG. 6, and FIG. 8 is an overall perspective of a stator in FIG. 6.

This automotive alternator includes: a case 3 composed of an aluminum front bracket 1 and an aluminum rear bracket 2; a rotating shaft 6 disposed within the case 3 having a pulley 4 secured to a first end thereof; a Lundell-type rotor 7 secured to the rotating shaft 6; fans 5 secured to first and second axial end surfaces of the rotor 7; a stator 8 secured to an inner wall within the case 3; slip rings 9 secured to a second end of the rotating shaft 6 for supplying electric current to the rotor 7; a pair of brushes 10 sliding on surfaces of the slip rings 9; brush holders 11 accommodating the brushes 10; a rectifier 12 electrically connected to the stator 8 for converting alternating current generated in the stator 8 into direct current; and a regulator 18 fitted over the brush holder 11 for adjusting the magnitude of the alternating voltage generated in the stator 8.

Air intake openings 3a for sucking cooling air into the case 3 and air discharge openings 3b for expelling the cooling air to the outside by rotation of the fans 5 are formed in the case 3.

The rotor 7 includes a rotor coil 13 for generating magnetic flux by passing an electric current, and a pole core 14 disposed so as to cover the rotor coil 13, magnetic poles being formed in the pole core 14 by the magnetic flux. The pole core 14 is constituted by a first pole core body 21 and a second pole core body 22 which intermesh with each other. The first pole core body 21 and the second pole core body 22 are made of iron and include tapered first and second claw-shaped magnetic poles 23 and 24.

The stator 8 is constituted by a stator core 15 for passage of a rotating magnetic field from the rotor 7, and a stator coil 16 constructed by winding wires into the stator core 15, an output current flowing through the stator coil 16.

The above stator core 15 is constituted by a base portion 30 having notches 48 on an outer circumferential portion, and a plurality of tooth portions 31 which protrude radially inwards from the base portion 30. Slots 32 are formed between adjacent tooth portions 31, and wires are wound continuously into the slots 32.

Figure 9:
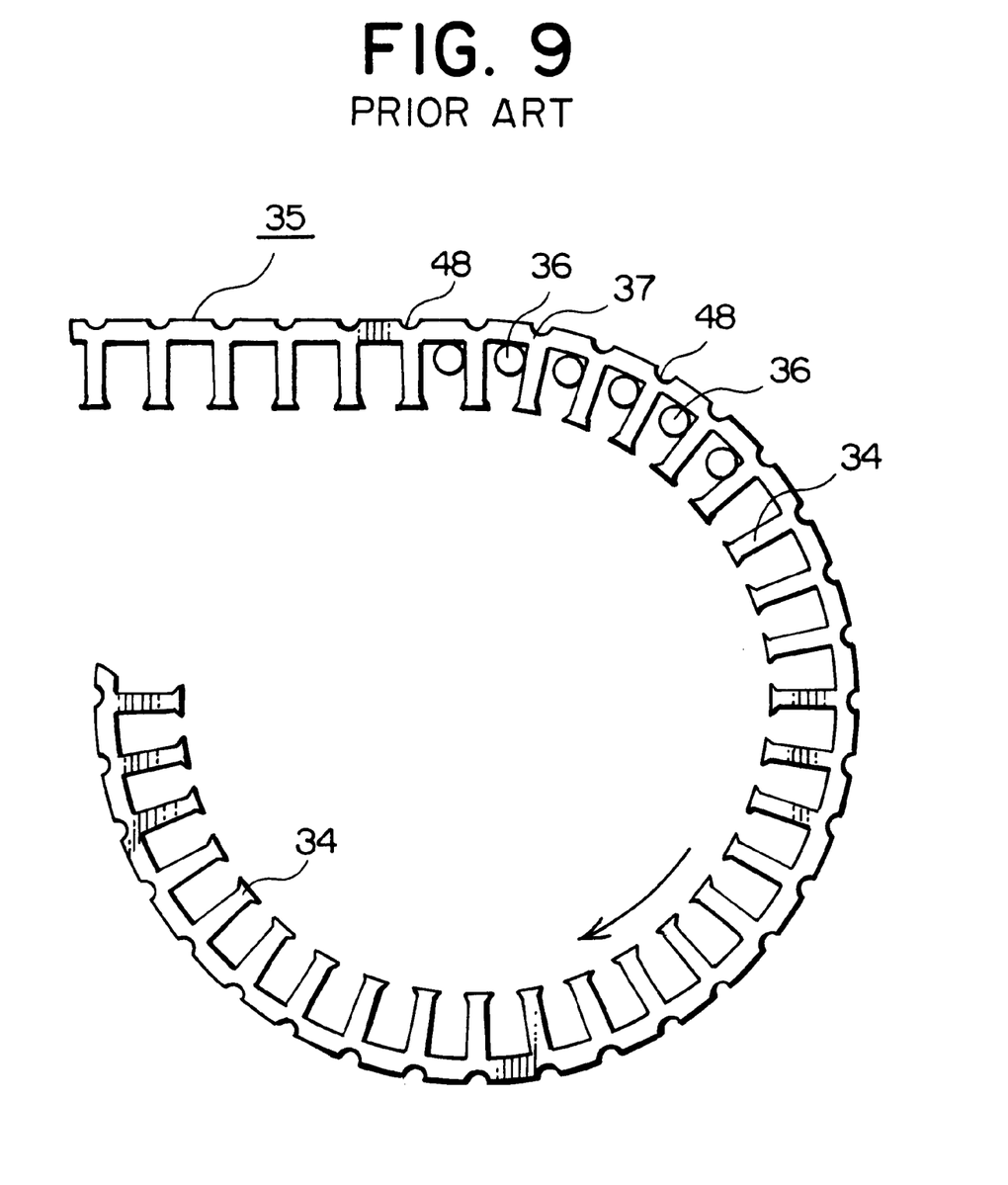
FIG. 9 is a diagram showing the stator core in FIG. 6 during manufacture.

FIG. 9 is a diagram showing the stator core 15 during manufacture. The stator core 15 is manufactured from a straight strip-shaped steel plate 35, which is stamped so as to have a frame portion 37 and a plurality of tooth segments 34 at an even pitch, by laminating and bending the steel plate 35 into a helical shape such that tips of the tooth segments 34 point towards a center. In this example, the stator core 15 is bent and formed by inserting shaping pins 36 into the slots 32. The laminated steel plate 35, which has a thickness of 0.5 mm, is integrated by laser welding at eight places on the outer circumferential portion.

In the automotive alternator described above, electric current is supplied from a battery (not shown) through the brushes 10 and the slip rings 9 to the rotor coil 13, generating magnetic flux. The claw-shaped magnetic poles 23 of the first pole core body 21 are magnetized with north-seeking (N) poles by this magnetic flux, and the claw-shaped magnetic poles 24 of the second pole core body 22 are magnetized with south-seeking (S) poles. At the same time, because the engine is driven by the pulley 4 and the rotor is rotated by the rotating shaft 6, a rotating magnetic field is applied to the stator core 15, generating electromotive force in the stator coil 16. This alternating electromotive force passes through the rectifier 12 and is converted into direct current, the magnitude of the current is adjusted by the regulator 18, and the battery is recharged.

As described above, the cooling air flow generated by the fans 5 is sucked in through the air intake openings 3a formed in the front-end and rear-end brackets 1 and 2, passing in close proximity to and cooling the rectifier 12 and the regulator 18 which are heat-generating portions at a rear end of the alternator, then passes from a radially inner side to a radially outer side between fan blades 5a at both the rear end and a front end, thereby cooling front-end coil ends 16a and rear-end coil ends 16b of the stator coil 16 before being expelled through the air discharge openings 3b. In other words, a high degree of heat is generated but the coil ends of the stator coil 16 whose output performance is affected by high temperatures are constructed so as to be reliably cooled by positioning them between the fan blades 5a and the air discharge openings 3b on the brackets 1 and 2.

In the automotive alternator of the above construction, the stator coil 16 has three phases, the rotor 7 has twelve magnetic poles, and the slots 32 are formed at a ratio of one per pole per phase, the total number of slots 32 being thirty-six.

Figure 10:
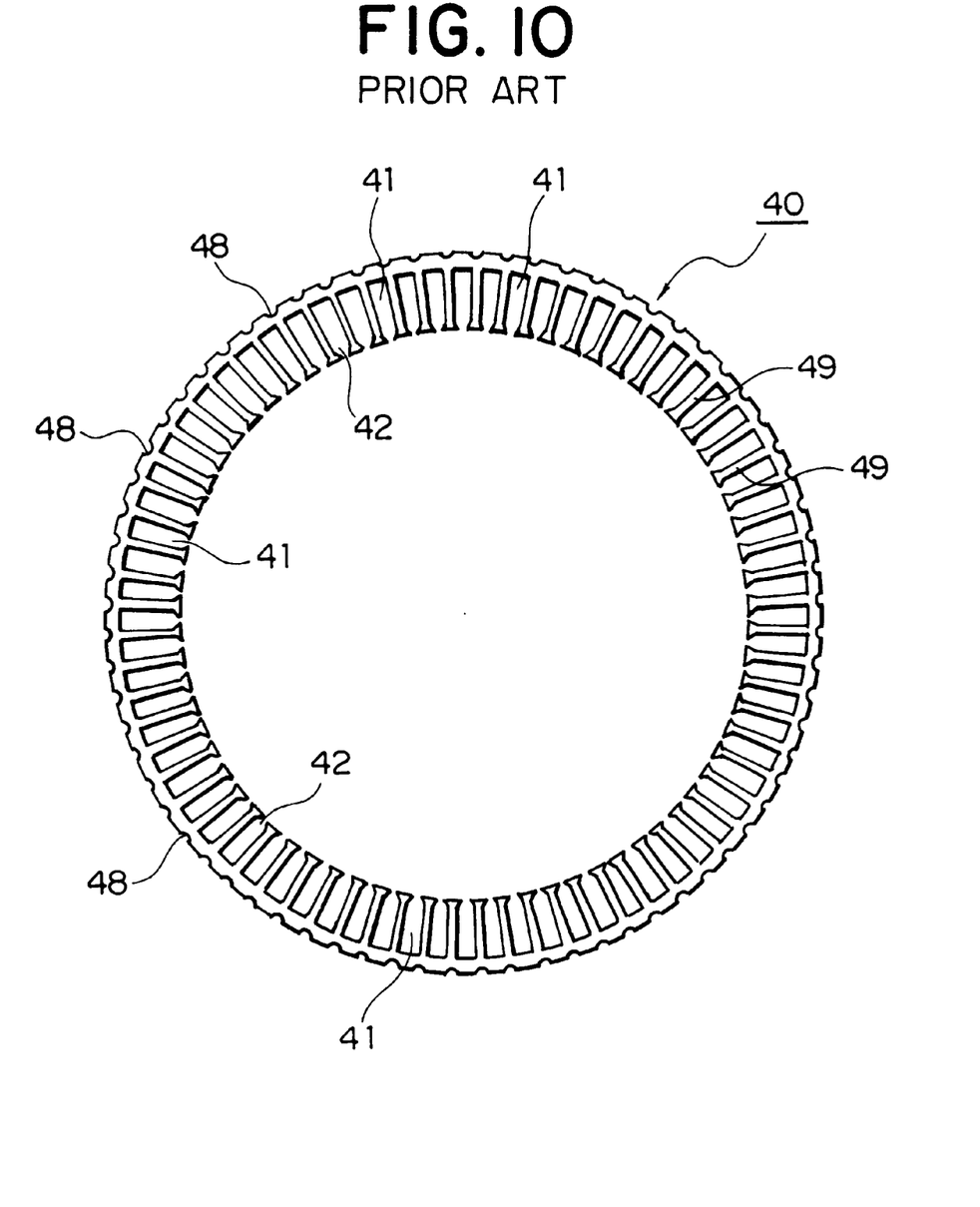
FIG. 10 is a plan of a stator core having seventy-two slots.

Now, as disclosed in Japanese Patent Laid-Open No. HEI 4-26345, for example, a stator core is known which is formed with slots at a ratio of two per pole per phase with the aim of providing an automotive alternator in which output voltage is improved and voltage fluctuations are reduced by making an overlapping portion between the claw-shaped magnetic poles of the rotor and the tooth portions of the stator core as small as possible to reduce magnetic flux leakage through the tooth portions and reduce ripples in the rectified output voltage. For example, when the number of phases in the stator coil is three and the number of poles in the rotor is twelve, the total number of slots 41 in a stator core 40 is seventy-two, as shown in FIG. 10.

Because opening portions 42 of the slots 41 become narrow when the number of the slots 41 in the stator core 40 is seventy-two, it is difficult to continuously wind wires of a stator coil from a radially inner side of the stator core 40 through the opening portions 42.

Figure 11:
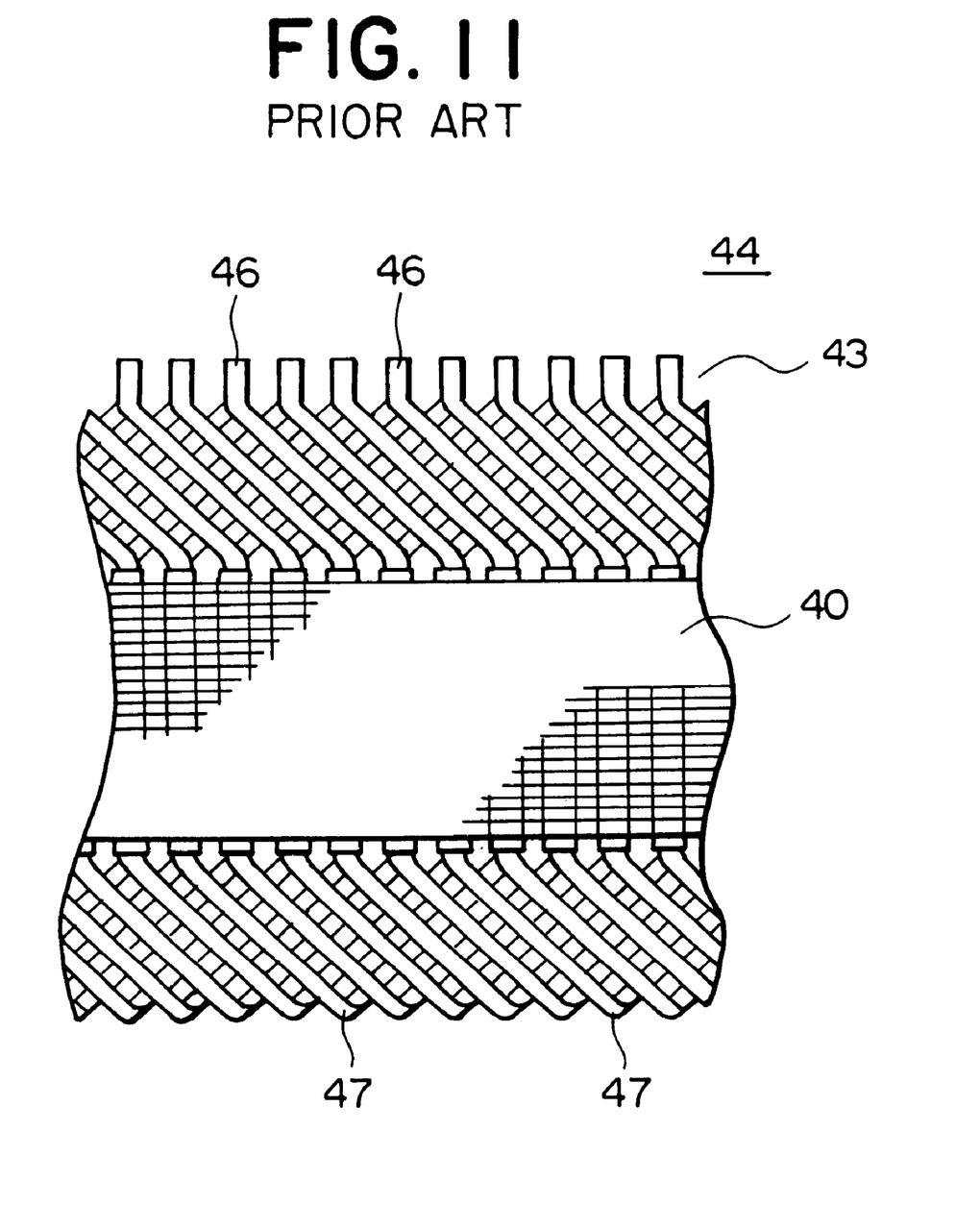
FIG. 11 is a partial front elevation of another example of a conventional stator.

A technical means for solving such difficulties is disclosed in Japanese Patent No. 2927288. FIG. 11 is a partial front elevation of a stator 44 in which a stator coil 43 has been mounted to the stator core 40 without difficulty using this technical means even though the number of the slots 41 in the stator core 40 is seventy-two.

Figure 12:
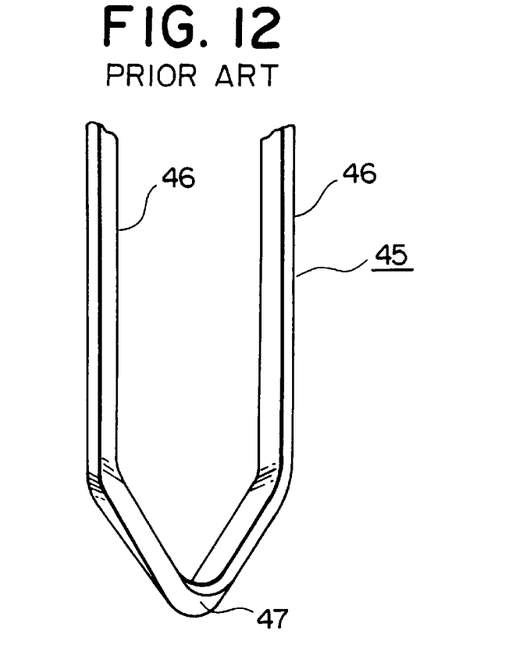
FIG. 12 is a perspective of an electrical conductor in FIG. 11.

This stator coil 43 is constituted by a plurality of electrical conductors 45, such as the one shown in FIG. 12. This electrical conductor 45 is constituted by first and second straight portions 46 and a turn portion 47 connecting the straight portions 46 to each other. The first straight portions 46 of the electrical conductors 45 are positioned on a radially inner side being on the opening portion 42 side in a radial direction of first slots 41 to form an inner layer, and the second straight portions 46 of the electrical conductors 45 are positioned on a radially outer side in a radial direction of second slots 41 to form an outer layer.

The electrical conductors 45 are inserted into the slots 41 from a first end surface of the stator core 40 and are stacked up on top of each other such that the turn portions 47 thereof line up in rows. The straight portions 46 on the inner layer and the outer layer which protrude at a second end surface of the slots 41 are bent in a circumferential direction of the stator core 40, and are connected in series to the straight portions 46 in a different layer of the electrical conductors 45 a distance of one pole away, forming the stator coil 43.

Figure 13:
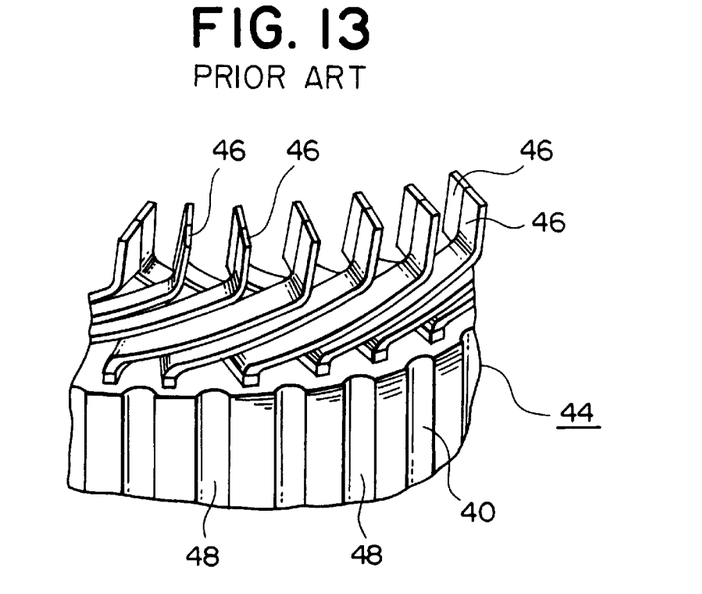
FIG. 13 is a partial perspective of an end surface of the stator in FIG. 11 viewed from an end where the electrical conductors are connected.
Figure 14:
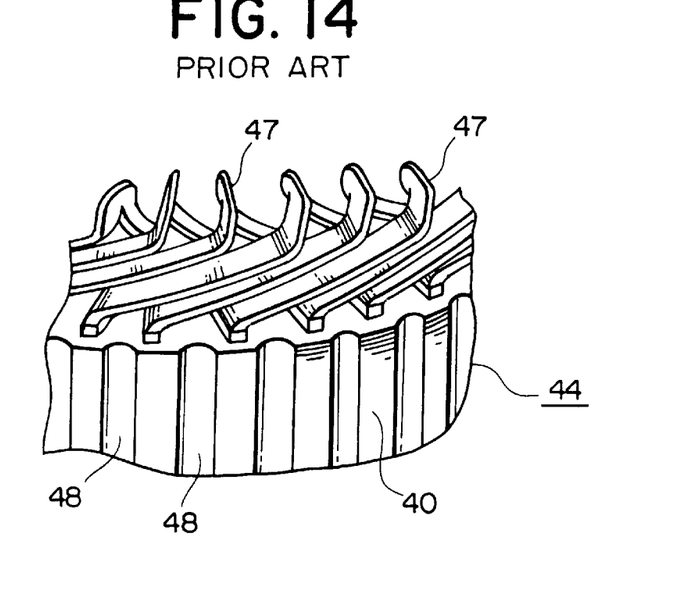
FIG. 14 is a partial perspective of the end surface of the stator in FIG. 11 viewed from an end where the electrical conductor are inserted.

FIG. 13 is a partial perspective of an end surface of the stator 44 viewed from the end where the electrical conductors 45 are connected, and FIG. 14 is a partial perspective of the end surface of the stator 44 viewed from the end where the electrical conductors 45 are inserted.

Figure 15:
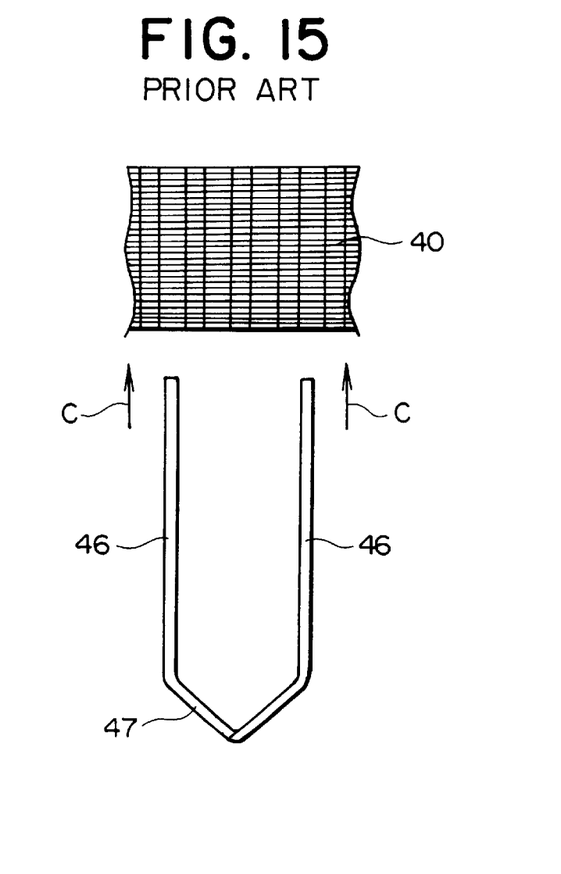
FIG. 15 is a diagram explaining the state during insertion of the electrical conductor into the stator core (before coil insertion)
Figure 16:
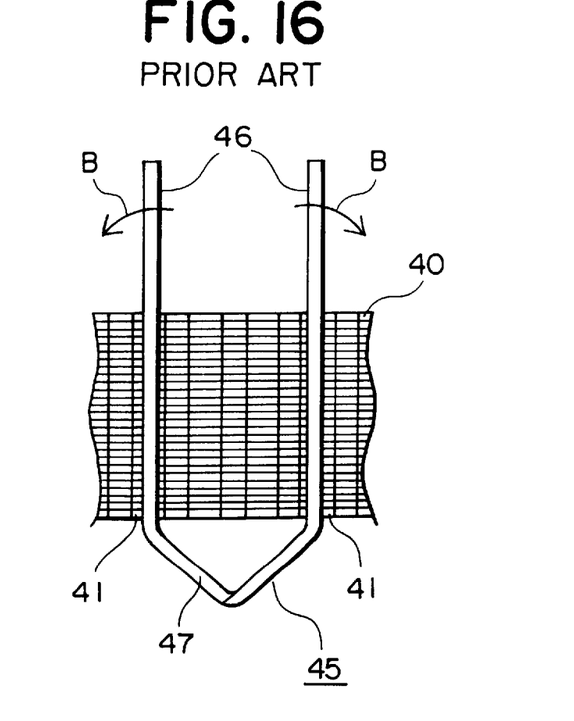
FIG. 16 is a diagram explaining the state after insertion of the electrical conductor into the stator core (after coil insertion)

In the automotive alternator constructed in this manner, because the opening portions 42 of the slots 41 become narrow when the number of slots per pole per phase is two, it is difficult to continuously wind wires of the stator coil from the radially inner side of the stator core 40 through the opening portions 42. As a means of solving this, as shown in FIGS. 15 to 17, the electrical conductors 45 are inserted from the first end surface of the slots 41 of the stator core 40, and after protruding from the second end surface of the slots 41, each of the straight portions 46 is bent (twist formation) in the circumferential direction of the stator core 40, and connected in series to the straight portions 46 of the electrical conductors 45 in a different layer a distance of one pole away.

In the conventional automotive alternator constructed in this manner, the stator coil generates heat due to the generated electric current and the temperature rises, causing a reduction in part life.

Figure 17:
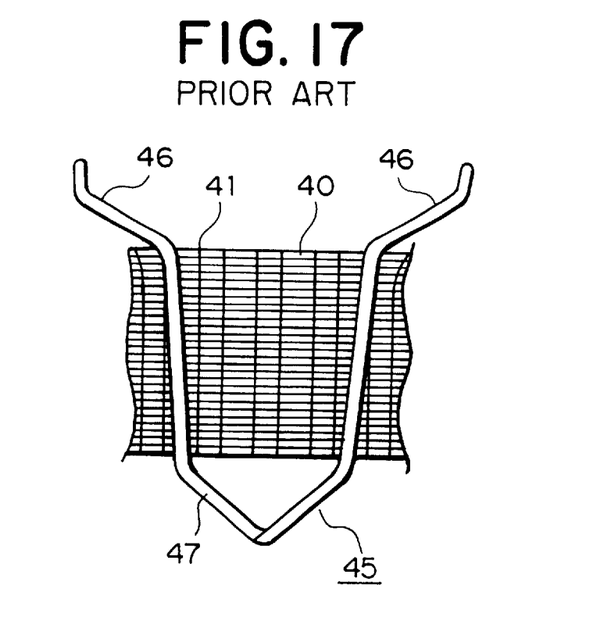
FIG. 17 is a diagram explaining the state after inserting the electrical conductor into the stator core and bending straight portions thereof in a circumferential direction of the stator core (after coil twist formation).

When the straight portions 46 are bent (twist formation) in the direction of arrows B, which is the circumferential direction, excessive stress is applied to core end portions, and one problem has been that on the radially inner side of the stator core 40 the steel plate 35 deforms circumferentially and misaligns as shown in FIG. 17, disturbing a magnetic circuit and reducing output voltage.

Another problem has been that when the electrical conductors 45 are inserted at the first end surface of the slots 41 of the stator core 40 in the direction of arrows C, tip end surfaces of the straight portions 46 come into contact with a peripheral edge portion of the slots 41 of the stator core 40, scraping the insulation coating off a surface of the electrical conductors 45 and causing poor pressure resistance.

Yet another problem has been that magnetic flux leakage arises at the tip surfaces of the tooth portions 31, decreasing output current.

SUMMARY OF THE INVENTION

The present invention aims to solve the above problems and an object of the present invention is to provide a stator for an automotive alternator which can suppress temperature increases, prevent drops in output, prevent poor pressure resistance, and prevent decreases in output current.

In order to achieve the above object, according to one aspect of the present invention, there is provided a stator for an automotive alternator, the automotive alternator including:

a rotor having first and second claw-shaped magnetic poles fitted onto a rotating shaft; and a stator having a stator core supported between front-end and rear-end brackets, a stator coil which is connected into a three-phase alternating current connection being wound into the stator core, the stator core including:

a core main body constructed by laminating a strip-shaped steel plate, the core main body including a base portion and a plurality of tooth portions protruding radially inwards from the base portion defining core main body slots; and an end plate which is thicker than the steel plate being disposed on at least one end surface of the core main body.

The core main body may be constructed by laminating the strip-shaped steel plate formed with a plurality of tooth segments at an even pitch while bending the strip-shaped steel plate into a helical shape such that tips of the tooth segments point towards a center.

The core main body may be constructed by laminating a plurality of the steel plates in an axial direction, the steel plates being annular in shape and being formed with a plurality of tooth segments at an even pitch on an inner circumferential side.

Each of the tooth portions of the stator may be positioned to form an overlapping portion overlapping two of the first and second claw-shaped magnetic poles on the rotor facing the tooth portion, the two first and second claw-shaped magnetic poles having different polarity and being adjacent in a direction of rotation of the rotor, the end plate being disposed at one end of the overlapping portion thereof.

The rotor may have centrifugal fans on first and second axial end portions; and coil ends of the stator core of the automotive alternator may be cooled by cooling air which is sucked in through air intake openings and expelled through air discharge openings disposed in the front-end and rear-end brackets.

The stator coil may be constructed by passing a plurality of generally U-shaped coil segments through the stator core from a first end of the stator core, then forming twists in the generally U-shaped coil segments at the end plate end, and joining together end portions of the generally U-shaped coil segments by welding, the generally U-shaped coil segments being made of copper having a generally flat cross-sectional shape having an insulation coating disposed thereon, the stator coil including:

a pair of conductors disposed in a straight line in a radial direction in each of the core main body slots;

insulating paper for electrically insulating the coil segments from the stator core; and a joint portion joining an inner-layer-side coil segment end and an outer-layer-side coil segment end.

A circumferential width dimension of an end plate slot formed in the end plate may be larger than a circumferential width dimension of the core main body slots formed in the core main body.

A corner portion at an end of the end plate slot formed on the end plate where the generally U-shaped coil segments enter may be eased.

A resin may be impregnated into a coil end, a greater amount of the resin being impregnated into the coil end at an end surface portion of the stator core than into other portions of the coil end.

DETAILED DESCRIPTION OF THE PREFERRED EMBODIMENT

Embodiment 1

Figure 1:
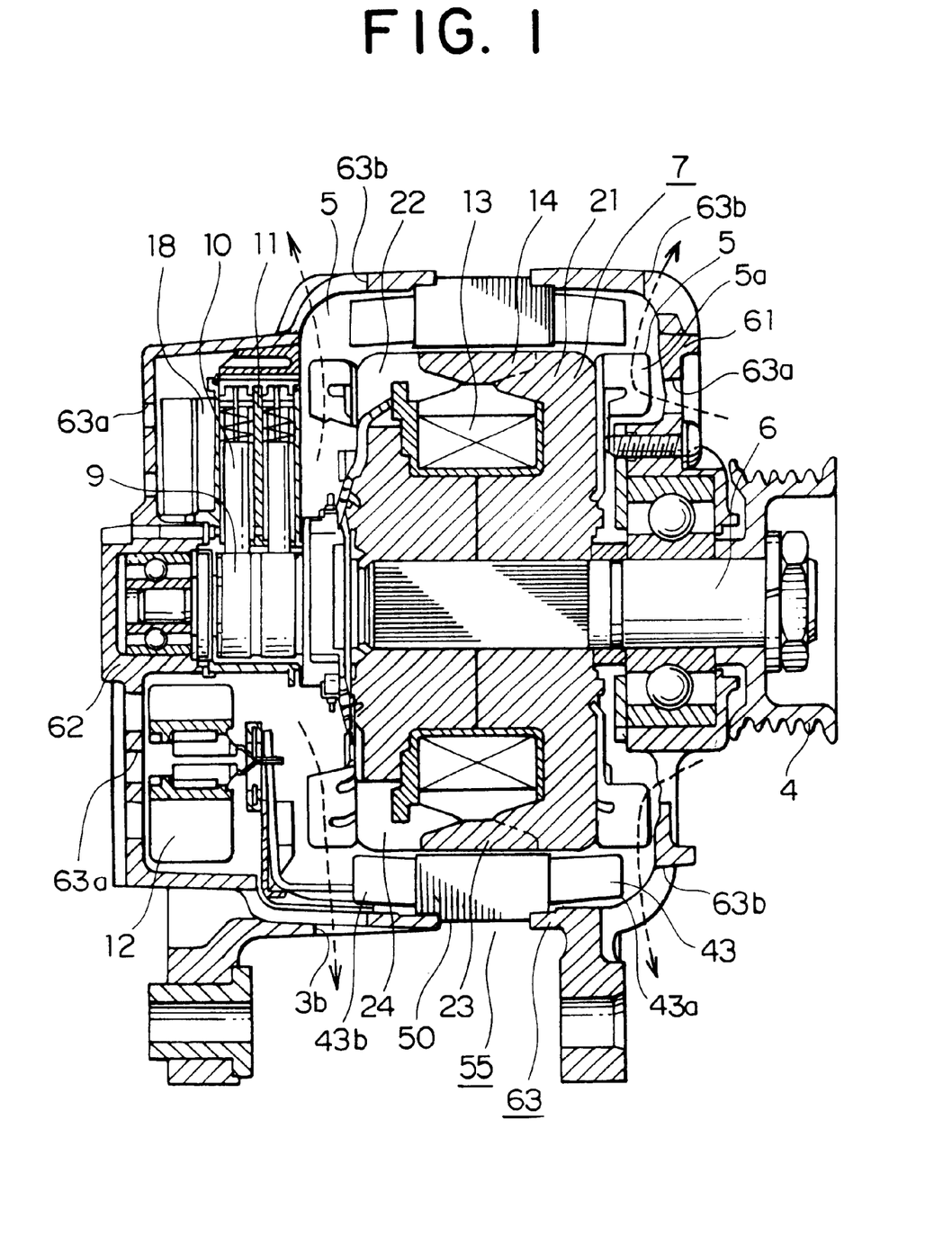
FIG. 1 is a cross section of an automotive alternator according to the present invention.
Figure 2:
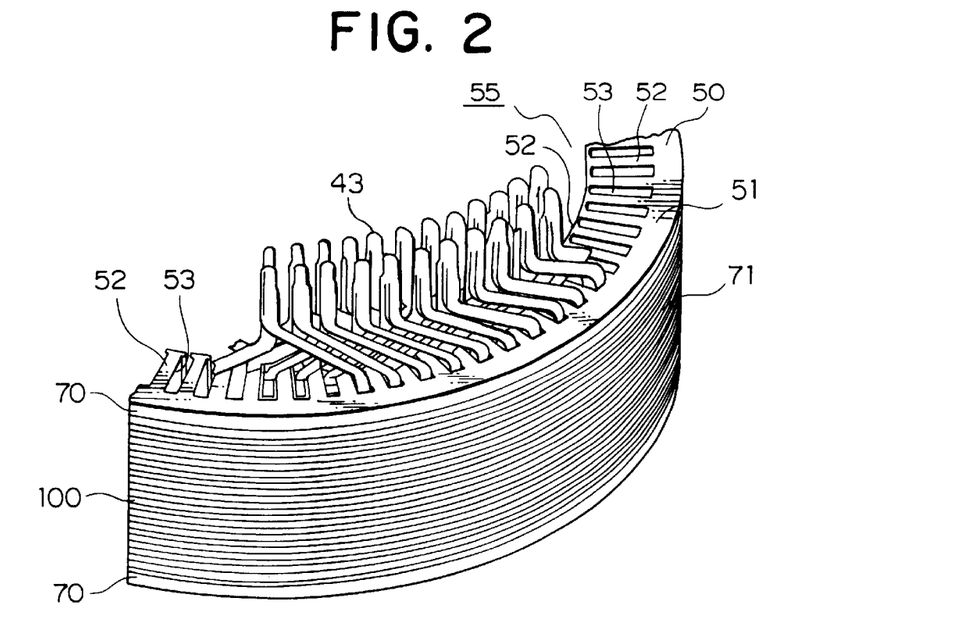
FIG. 2 is a partial perspective of a stator in FIG. 1.

FIG. 1 is a cross section of an automotive alternator according to the present invention, and FIG. 2 is a partial perspective of a stator 55 in FIG. 1.

This automotive alternator includes: a case 63 composed of an aluminum front-end bracket 61 and an aluminum rear-end bracket 62; a rotating shaft 6 disposed within the case 63 having a pulley 4 secured to a first end thereof; a Lundell-type rotor 7 secured to the rotating shaft 6; fans 5 secured to first and second axial end surfaces of the rotor 7; a stator 55 secured to an inner wall within the case 63; slip rings 9 secured to a second end of the rotating shaft 6 for supplying electric current to the rotor 7; a pair of brushes 10 sliding on surfaces of the slip rings 9; brush holders 11 accommodating the brushes 10; a rectifier 12 electrically connected to the stator 55 for converting alternating current generated in the stator 55 into direct current; and a regulator 18 fitted over the brush holder 11 for adjusting the magnitude of the alternating voltage generated in the stator 55.

Air intake openings 63a for sucking cooling air into the case 63 and air discharge openings 63b for expelling the cooling air to the outside by rotation of the fans 5 are formed in the case 63. An intermediate portion of a stator core 50 is exposed to the outside.

The rotor 7 includes a rotor coil 13 for generating magnetic flux by passing an electric current, and a pole core 14 disposed so as to cover the rotor coil 13, magnetic poles being formed in the pole core 14 by the magnetic flux. The pole core 14 is constituted by a first pole core body 21 and a second pole core body 22 which intermesh with each other. The first pole core body 21 and the second pole core body 22 are made of iron and include tapered first and second claw-shaped magnetic poles 23 and 24.

The stator 55 is constituted by the stator core 50 for passage of a rotating magnetic field from the rotor 7, and a stator coil 43 which has a plurality of electrical conductors 45 connected and installed in the stator core 50, an output current flowing through the stator coil 43.

This stator core 50 is constituted by: a core main body 71 constructed by laminating and bending a strip-shaped steel plate 100 into a helical shape such that tips of the tooth segments point towards a center, as is conventionally done, the steel plate 100 being stamped so as to have a plurality of tooth segments at an even pitch; and end plates 70 which sandwich the core main body 71 from a first and second surface. The stator core 50 is integrated by securing the steel plate 100 to itself, and the steel plate 100 to the end plates 70, along an axial direction by laser welding at eight places on an outer circumferential surface.

This stator core 50 is constituted by a base portion 51 having a flat outer circumferential surface, and a plurality of tooth portions 52 which protrude radially inwards from the base portion 51. In this automotive alternator, the stator coil 43 has three phases, the rotor 7 has twelve poles, and the total number of slots 53 in the stator core 50 is seventy-two.

This stator coil 43 is constituted by a plurality of electrical conductors 45, such as the one shown in FIG. 12. This electrical conductor 45 is constituted by first and second straight portions 46 and a turn portion 47, or joint portion, connecting the straight portions 46 to each other. The first straight portions 46 of the electrical conductors 45 are positioned on a radially inner side being on the opening portion 42 side in a radial direction of first slots 41 to form an inner layer, and the second straight portions 46 of the electrical conductors 45 are positioned on a radially outer side in a radial direction of second slots 41 to form an outer layer. It may be advisable to provide an insulating paper for insulating the coil segments from the stator core.

Figure 3:
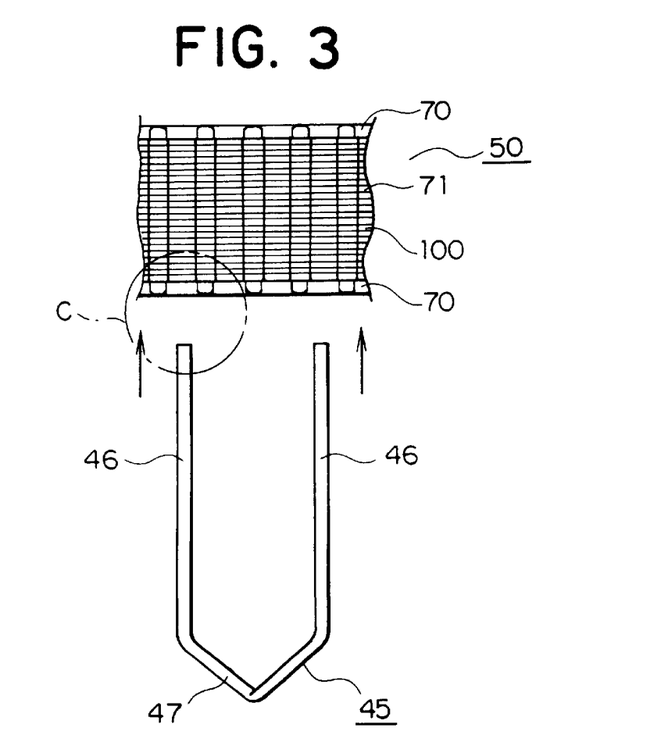
FIG. 3 is a diagram explaining insertion of an electrical conductor into a stator core.
Figure 4:
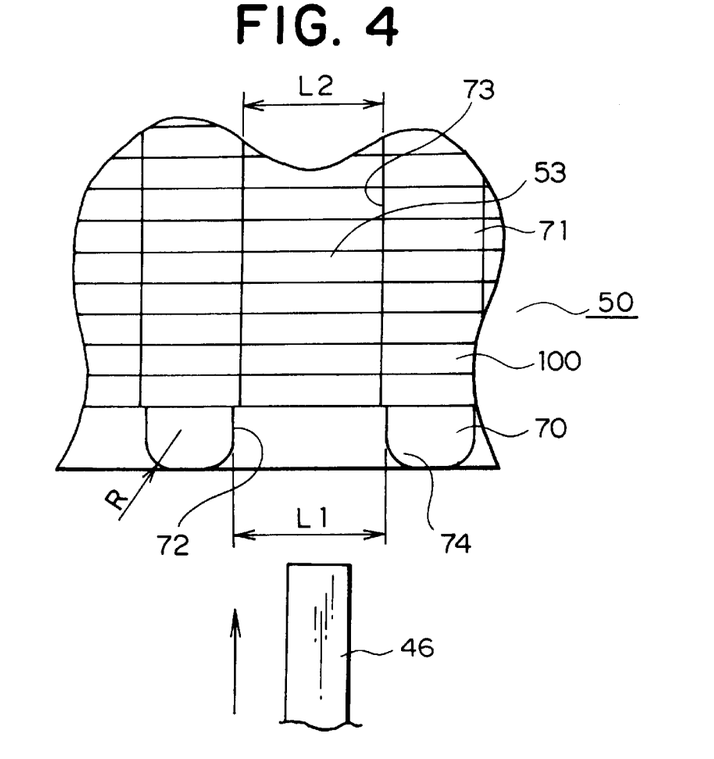
FIG. 4 is an enlargement of area C in FIG. 3.

FIG. 3 is a diagram explaining the state of the electrical conductor 45 during insertion into the stator core 50 in FIG. 2, and FIG. 4 is an enlargement of area C in FIG. 3.

In the stator core 50 according to the present embodiment, because the end plates 70 which are thicker than the steel plates 100 are disposed on end surfaces, rigidity of the stator core 50 can be improved, enabling drops in output to be prevented because misalignment of the core and disruption of the magnetic circuit is eliminated.

When the stator core 50 is manufactured by laminating and bending the strip-shaped steel plate 100 into a helical shape, the end portions at a winding start portion and a winding finish portion of the steel plate 100 are not welded in some cases, and a conventional problem in such cases has been that the winding start portion and the winding finish portion are easily peeled away, contacting the stator coil and causing short-circuits, thereby reducing output, but because the end plates 70 are welded onto the end surfaces in the stator core 50 according to the present embodiment, peeling of the steel plates 100 can be completely prevented.

In addition, in the stator core 50 according to the present embodiment, a circumferential width L1 of an end plate slot 72 of the end plates 70 is wider than a circumferential width L2 of a core main body slot 73 of the core main body 71, and a corner portion of the end of the end plate slots 72 where the electrical conductors 45 enter is eased into an arc-shaped cross section, forming a curved surface portion 74. For that reason, when the straight portions 46 of the electrical conductors 45 are inserted into the slots 53 of the stator core 50, the electrical conductors 45 can be inserted into the slots 53 without damaging an insulation coating on the straight portions 46.

As described above, the cooling air flow generated by the fans 5 is sucked in through the air intake openings 63*a* formed in the front-end and rear-end brackets 61 and 62, passing in close proximity to and cooling the rectifier 12 and the regulator 18 which are heat-generating portions at a rear end of the alternator, then passes from a radially inner side to a radially outer side between fan blades 5*a* at both the rear end and a front end, thereby cooling front-end coil ends 43*a* and rear-end coil ends 43*b* of the stator coil 43 before being expelled through the air discharge openings 63*b*. In other words, a high degree of heat is generated and the coil ends of the stator coil 43 whose output performance is affected by high temperatures are constructed so as to be reliably cooled by positioning them between the fan blades 5*a* and the air discharge openings 63*b* on the brackets 61 and 62. At this time, the cooling air from the fans 5 also comes into contact with the end surfaces of the stator core 50, cooling not only the coil which is exposed as the coil ends 43*a* and 43*b,* but also cooling the end surfaces of the stator core 50. At this case, in the stator core 50 according to the present embodiment in which thick end plates 70 are disposed on these end surfaces, temperature increases can be minimized in the entire stator because heat transfer is promoted within the core.

Figure 5:
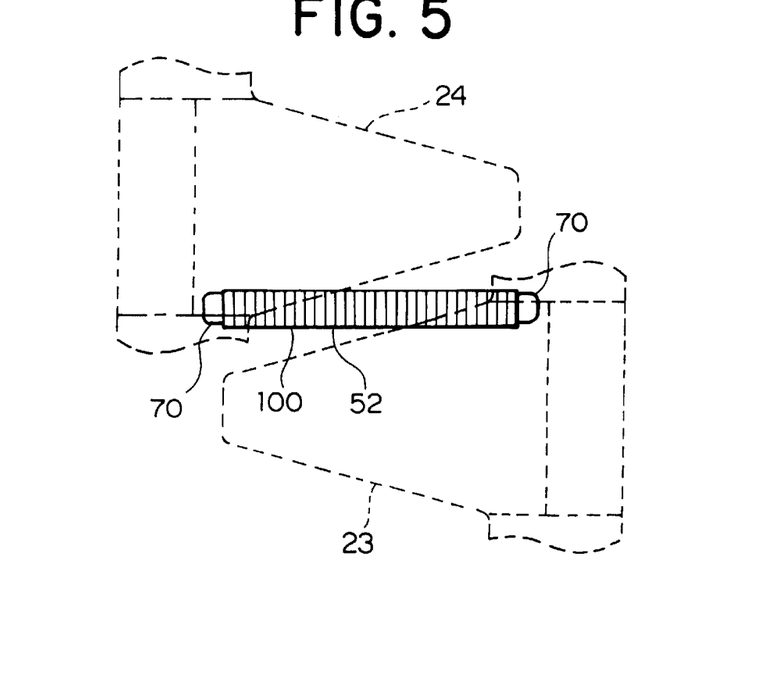
FIG. 5 is a diagram showing overlapping of a claw-shaped magnetic pole and a tooth portion.

In the stator core 50 according to the present embodiment, when the tooth portions 52 are positioned in a center between the claws of two of the first and second claw-shaped magnetic poles 23 and 24 having different polarity when viewed from a radial direction as in FIG. 5, the first and second end portions of each of the tooth portions 52 formed in the stator core 50 are formed so as to simultaneously overlap the two first and second claw-shaped magnetic poles 23 and 24 having different polarity and being adjacent in a direction of rotation of the rotor 7 facing the first and second end portions of the tooth portions 52. The end plates 70 are positioned on end portions of these overlapping portions.

Conventionally, magnetic flux which has entered the tooth portions 52 from the claw-shaped magnetic poles constitutes the magnetic circuit by passing through outer radial portions of the core to tooth portions 52 which are a pitch of one magnetic pole away, but due to the construction of the claw-shaped magnetic poles, the magnetic flux passes along a surface of the tooth portions 52 and a certain amount leaks to the adjacent magnetic pole. In the present embodiment, because the thick end plates 70 are disposed on the core end surfaces, it is easier for the magnetic flux which has entered the tooth portions 52 from claw roots to pass through an outer side (on an inner portion side) than along the surface of the tooth portions 52. For that reason, the amount of magnetic flux leakage at tip surfaces of the tooth portions 52 is reduced, increasing output current.

In the stator core 50 according to the present embodiment, a resin is impregnated into the coil ends 43*a* and 43*b*, a greater amount of the resin being impregnated into the coil ends 43*a* and 43*b* at end surface portions of the stator core 50 than into other portions of the coil ends 43*a* and 43*b*. For that reason, the resin is impregnated between the stator coil 43 and the stator core 50, further improving electrical insulation.

Moreover, in the embodiment described above, the core main body 71 is constructed by laminating and bending the strip-shaped steel plate 100 into the helical shape such that the tips of the tooth segments point towards the center, the steel plate 100 being stamped so as to have a plurality of tooth segments at an even pitch, but the core main body is not limited to this example and may also be constructed by laminating a plurality of annular steel plates in an axial direction, the steel plates being formed with a plurality of tooth segments at an even pitch on an inner circumferential side.

In the embodiment described above, the corner portion of the entrance end of the electrical conductors 45 of the end plate slot 72 is eased into an arc-shaped cross section, forming the curved surface portion 74, but the corner portion of the end plate slot 72 may also be eased into a tapered shape, achieving the same general effect.

In order to achieve the above object, according to one aspect of the present invention, there is provided a stator for an automotive alternator, the automotive alternator including:

a rotor having first and second claw-shaped magnetic poles fitted onto a rotating shaft; and a stator having a stator core supported between front-end and rear-end brackets, a stator coil which is connected into a three-phase alternating current connection being wound into the stator core, the stator core including:

a core main body constructed by laminating a strip-shaped steel plate, the core main body including a base portion and a plurality of tooth portions protruding radially inwards from the base portion defining core main body slots; and an end plate which is thicker than the steel plate being disposed on at least one end surface of the core main body. For that reason, rigidity of the stator core can be improved, enabling drops in output to be prevented because misalignment of the core and disruption of the magnetic circuit is eliminated. Furthermore, the amount of thermal conductivity in the end portion at the end on which the end plate of the stator core is disposed increases, reducing temperature increases in the stator coil and enabling drops in output to be prevented.

The core main body may be constructed by laminating the strip-shaped steel plate formed with a plurality of tooth segments at an even pitch while bending the strip-shaped steel plate into a helical shape such that tips of the tooth segments point towards a center. For that reason, the problem of peeling away of the steel plate at a winding start portion and a winding finish portion of the steel plate of the core body can be completely prevented.

The core main body may be constructed by laminating a plurality of the steel plates in an axial direction, the steel plates being annular in shape and being formed with a plurality of tooth segments at an even pitch on an inner circumferential side. For that reason, rigidity of the stator core can be further improved, enabling drops in output to be prevented because misalignment of the core and disruption of the magnetic circuit is eliminated.

Each of the tooth portions of the stator may be positioned to form an overlapping portion overlapping two of the first and second claw-shaped magnetic poles on the rotor facing the tooth portion, the two first and second claw-shaped magnetic poles having different polarity and being adjacent in a direction of rotation of the rotor, the end plate being disposed at one end of the overlapping portion thereof. For that reason, because the amount of magnetic flux leakage at the tip surfaces of the tooth portions is reduced, output current in the alternator can be increased.

The rotor may have centrifugal fans on first and second axial end portions; and coil ends of the stator core of the automotive alternator may be cooled by cooling air which is sucked in through air intake openings and expelled through air discharge openings disposed in the front-end and rear-end brackets. For that reason, heat transferred to the end surface of the stator core can be efficiently cooled, further reducing temperature increases in the stator coil.

The stator coil may be constructed by passing a plurality of generally U-shaped coil segments through the stator core from a first end of the stator core, then forming twists in the generally U-shaped coil segments at the end plate end, and joining together end portions of the generally U-shaped coil segments by welding, the generally U-shaped coil segments being made of copper having a generally flat cross-sectional shape having an insulation coating disposed thereon, the stator coil including:

a pair of conductors disposed in a straight line in a radial direction in each of the core main body slots;

insulating paper for electrically insulating the coil segments from the stator core; and a joint portion joining an inner-layer-side coil segment end and an outer-layer-side coil segment end. For that reason, misalignment of the core during twist formation can be reduced, enabling drops in output due to disruption of the magnetic circuit to be prevented.

A circumferential width dimension of an end plate slot formed in the end plate may be larger than a circumferential width dimension of the core main body slots formed in the core main body. For that reason, scraping off of the insulation coating caused by contact with the stator core when inserting the stator coil and deformation of the coil are reduced, enabling short-circuiting between the stator core and the stator coil to be reduced to a minimum. Furthermore, in the coil end at the twist formation end of the stator coil, the problem of short-circuiting due to scratching of the insulation coating on the stator coil caused by pressure on the coil during twist formation can be reduced.

A corner portion at an end of the end plate slot formed on the end plate where the generally U-shaped coil segments enter may be eased. For that reason, scraping off of an insulation coating caused by contact with the stator core when inserting the stator coil and deformation of the coil are reduced, enabling short-circuiting between the stator core and the stator coil to be reduced to a minimum. Furthermore, in a coil end at the twist formation end of the stator coil, the problem of short-circuiting due to scratching of the insulation coating on the stator coil caused by pressure on the coil during twist formation can be reduced.

A resin may be impregnated into a coil end, a greater amount of the resin being impregnated into the coil end at an end surface portion of the stator core than into other portions of the coil end. For that reason, resin is impregnated between the stator coil and the stator core, further improving insulation.

What is claimed is:

1. An automotive alternator, comprising:
   a rotor having first and second claw-shaped magnetic poles fitted onto a rotating shaft; and
   a stator having a stator core supported between front-end and rear-end brackets, and a stator coil, which is connected in a three-phase alternating current connection, being wound into said stator core,
   said stator core comprising:
      a core main body constructed by laminating strip-shaped steel plates, said core main body comprising a base portion and a plurality of tooth portions protruding radially inwards from said base portion to define core main body slots; and
      an end plate which is thicker than any of said steel plates and disposed on at least one end surface of said core main body, wherein a circumferential width of an end plate slot formed in said end plate is larger than a circumferential width of said core main body slots formed in said core main body,
   wherein each of said tooth portions of said stator is positioned to form an overlapping portion overlapping two of said first and second claw-shaped magnetic poles on said rotor facing said tooth portion, said two first and second claw-shaped magnetic poles having different polarity and being adjacent in a direction of rotation of said rotor, said end plate being disposed at one end of said overlapping portion thereof.

2. The automotive alternator according to claim 1 wherein said core main body is constructed by laminating said strip-shaped steel plates formed with a plurality of tooth segments at an even pitch while bending said strip-shaped steel plate into a helical shape such that tips of said tooth segments point towards a center thereof.

3. The automotive alternator according to claim 1 wherein said core main body is constructed by laminating a plurality of said steel plates in an axial direction, said steel plates being annular in shape and being formed with a plurality of tooth segments at an even pitch on an inner circumferential side.

4. The automotive alternator according to claim 1 wherein:
   said rotor has centrifugal fans on first and second axial end portions; and
   coil ends of said stator core of said automotive alternator are cooled by cooling air which is sucked in through air intake openings and expelled through air discharge openings disposed in said front-end and rear-end brackets.

5. The automotive alternator according to claim 1 wherein said stator coil is constructed by passing a plurality of generally U-shaped coil segments through said stator core from a first end of said stator core, then forming twists in said generally U-shaped coil segments at said end plate end, and joining together end portions of said generally U-shaped coil segments by welding, said generally U-shaped coil segments being made of copper having a generally flat cross-sectional shape having an insulation coating disposed thereon,
   said stator coil comprising:
      a pair of conductors disposed in a straight line in a radial direction in each of said core main body slots;
      insulating paper for electrically insulating said coil segments from said stator core; and
      a joint portion joining an inner-layer-side coil segment end and an outer-layer-side coil segment end.

6. The automotive alternator according to claim 5 wherein a corner portion at an end of said end plate slot formed on said end plate where said generally U-shaped coil segments enter is rounded.

7. The automotive alternator according to claim 1 wherein a resin is impregnated into said coil ends, a greater amount of said resin being impregnated into said coil ends at end surface portions of said stator core than into other portions of said coil ends.

* * * * *